United States Patent
Chen et al.

(10) Patent No.: US 10,642,094 B2
(45) Date of Patent: May 5, 2020

(54) DISPLAY PANEL

(71) Applicant: Au Optronics Corporation, Hsinchu (TW)

(72) Inventors: Ju-Chin Chen, Taipei (TW); Seok-Lyul Lee, Hsinchu (TW); Syuan-Ling Yang, Kaohsiung (TW); Yang-En Wu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/151,344

(22) Filed: Oct. 4, 2018

(65) Prior Publication Data

US 2019/0107753 A1    Apr. 11, 2019

(30) Foreign Application Priority Data

Oct. 6, 2017 (TW) .............................. 106134620 A

(51) Int. Cl.
| | |
|---|---|
| *G02F 1/1335* | (2006.01) |
| *G02F 1/1334* | (2006.01) |
| *G02F 1/1347* | (2006.01) |
| G02F 1/1337 | (2006.01) |
| G02F 1/133 | (2006.01) |

(Continued)

(52) U.S. Cl.
CPC ...... *G02F 1/133528* (2013.01); *G02F 1/1334* (2013.01); *G02F 1/13471* (2013.01); *G02F 1/1337* (2013.01); *G02F 1/1339* (2013.01); *G02F 1/13306* (2013.01); *G02F 1/133514* (2013.01); *G02F 1/134363* (2013.01); *G02F 2001/134372* (2013.01); *G02F 2201/121* (2013.01); *G02F 2201/123* (2013.01)

(58) Field of Classification Search
CPC ......... G02F 1/133514; G02F 1/133528; G02F 1/1337; G02F 1/1339; G02F 1/1334
See application file for complete search history.

(56) References Cited

U.S. PATENT DOCUMENTS

| | | | | |
|---|---|---|---|---|
| 5,194,973 A | * | 3/1993 | Isogai | .................. G02F 1/1334 349/10 |
| 5,296,952 A | * | 3/1994 | Takatsu | ............... G02F 1/13476 349/77 |

(Continued)

FOREIGN PATENT DOCUMENTS

| | | |
|---|---|---|
| CN | 103913880 | 7/2014 |
| CN | 203965768 | 11/2014 |

(Continued)

*Primary Examiner* — Dung T Nguyen
(74) *Attorney, Agent, or Firm* — JCIPRNET

(57) ABSTRACT

A display panel including a first substrate, a second substrate, a first display medium layer, a polarizing layer, and a second display medium layer is provided. The first display medium layer is disposed between the first substrate and the second substrate. The first display medium layer includes a first base material and a plurality of first encapsulated particles immobilized in the first base material. The average size of the first encapsulated particles is 1 nm to 400 nm. The polarizing layer is disposed between the first display medium layer and the second substrate. The polarizing layer is in contact with the first display medium layer. The second display medium layer is disposed between the polarizing layer and the second substrate.

20 Claims, 8 Drawing Sheets

(51) Int. Cl.
    *G02F 1/1339*    (2006.01)
    *G02F 1/1343*    (2006.01)

(56) References Cited

U.S. PATENT DOCUMENTS

| | | |
|---|---|---|
| 5,342,545 A | 8/1994 | Yamada et al. |
| 5,570,211 A | 10/1996 | Hanaoka et al. |
| 6,067,134 A | 5/2000 | Akiyama et al. |
| 6,399,166 B1 | 6/2002 | Khan et al. |
| 7,843,626 B2 | 11/2010 | Amundson et al. |
| 8,007,876 B2 | 8/2011 | Wu et al. |
| 9,146,415 B2 | 9/2015 | Baek et al. |
| 2012/0162586 A1 | 6/2012 | Baek et al. |
| 2014/0184984 A1 | 7/2014 | Kim et al. |
| 2015/0338717 A1 | 11/2015 | Paolini, Jr. et al. |
| 2018/0052342 A1 | 2/2018 | Chang et al. |

FOREIGN PATENT DOCUMENTS

| | | |
|---|---|---|
| CN | 106932952 | 7/2017 |
| KR | 20080108831 | 12/2008 |
| TW | 201227101 | 7/2012 |
| TW | 1596402 | 8/2017 |

\* cited by examiner

DISPLAY PANEL

CROSS-REFERENCE TO RELATED APPLICATION

This application claims the priority benefit of Taiwan application serial no. 106134620, filed on Oct. 6, 2017. The entirety of the above-mentioned patent application is hereby incorporated by reference herein and made a part of this specification.

BACKGROUND OF THE INVENTION

Field of the Invention

The invention relates to an electronic apparatus, and more particularly, to a display panel.

Description of Related Art

To achieve the desired display effect, a technical design includes stacking two liquid crystal display panels, wherein one of the liquid crystal display panels is used as a display panel to control display grayscale and the other one is used as a shutter panel to control the passing of display light. This design can increase display contrast and alleviate color shift. However, stacking two display panels often produces an issue in alignment accuracy, and interference fringes are generated due to Moiré effect as a result, such that the display is unsatisfactory. Moreover, since the structure formed by stacking two display panels is thicker, the light from the shutter panel may be incident at an angle to a region in the display panel not to be irradiated, such that dimming offset occurs at a non-normal angle of view, thus causing the issues of poor display (such as ghost image and/or discontinuous flaring).

SUMMARY OF THE INVENTION

The invention provides a display panel having a smaller thickness to reduce Moiré effect and the issue of poor display.

The display panel of the invention includes a first substrate, a second substrate, a first display medium layer, a polarizing layer, and a second display medium layer. The first display medium layer is disposed between the first substrate and the second substrate. The first display medium layer includes a first base material and a plurality of first encapsulated particles immobilized in the first base material, and the average size of the first encapsulated particles is 1 nm to 400 nm. The polarizing layer is disposed between the first display medium layer and the second substrate, and the polarizing layer is in contact with the first display medium layer. The second display medium layer is disposed between the polarizing layer and the second substrate.

Based on the above, the invention does not require two independent display panels to be stacked, and therefore the display panel of the invention has smaller thickness and the distance between the two display medium layers can be reduced to reduce Moiré effect and the issue of poor display.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
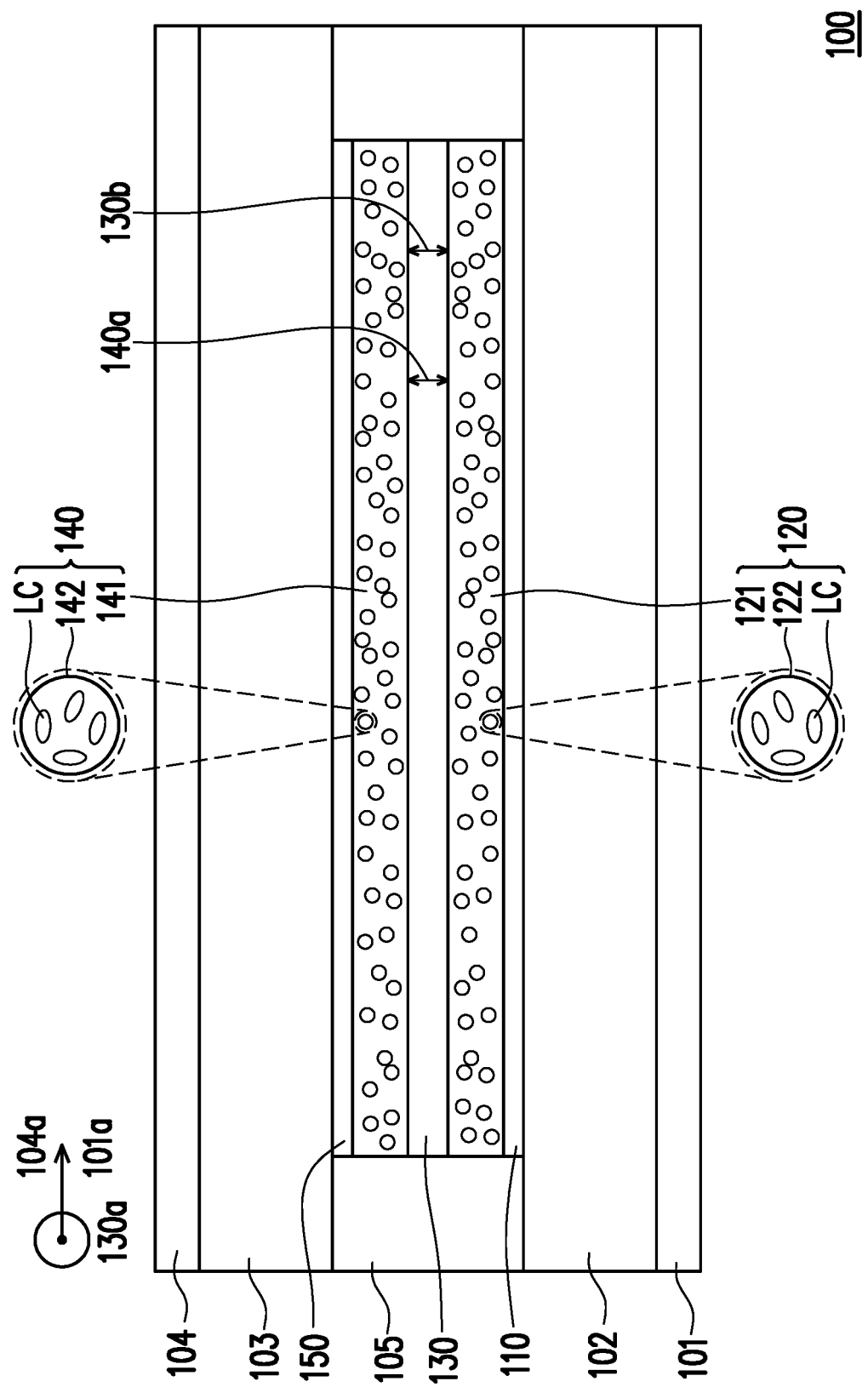
FIG. 1 is a cross section of a display panel according to the first embodiment of the invention.

FIG. 1 is a cross section of a display panel according to the first embodiment of the invention. A display panel 100 can include a first polarizer 101, a first substrate 102, a first driving layer 110, a first display medium layer 120, a polarizing layer 130, a second display medium layer 140, a second driving layer 150, a second substrate 103, a second polarizer 104, and a sealant 105. The first substrate 102 and the second substrate 103 can be attached together by facing each other vertically via the sealant 105. The material of the first substrate 102 and the second substrate 103 can be glass, quartz, organic polymer, metal, or other suitable materials and have a certain thickness and support to construct the volume and contour of the display panel 100, but the invention is not limited thereto. The material of the sealant 105 is, for instance, an adhesive material that can attach the first substrate 102 and the second substrate 103 together. The first polarizer 101 is disposed on the outside of the first substrate 102 and the second polarizer 104 is disposed on the outside of the second substrate 103 such that the first substrate 102, the polarizing layer 130, and the second substrate 103 are located between the first polarizer 101 and the second polarizer 104.

The first display medium layer 120 is disposed between the first substrate 102 and the polarizing layer 130 and located in a surrounding space of the sealant 105, and can be driven via the first driving layer 110 disposed between the first display medium layer 120 and the first substrate 102. The second display medium layer 140 is disposed between the polarizing layer 130 and the second substrate 103 and located in a surrounding space of the sealant 105, and can be driven via the second driving layer 150 disposed between the second display medium layer 140 and the second substrate 103.

The first polarizer 101, the polarizing layer 130, and the second polarizer 104 are suitable for respectively allowing light with a specific polarization state to pass through. That is, the first polarizer 101, the polarizing layer 130, and the second polarizer 104 respectively have a light absorption axis. In some embodiments, a light absorption axis direction 101a of the first polarizer 101 and a light absorption axis direction 104a of the second polarizer are substantially parallel to each other (for instance, the light absorption axis direction 101a and the light absorption axis direction 104a both are on the paper and in a direction towards right), and the light absorption axis direction 101a of the first polarizer 101 and the light absorption axis direction 104a of the second polarizer 104 are substantially respectively perpendicular to a light absorption axis direction 130a of the polarizing layer 130 (for instance, the light absorption axis direction 130a is in a direction perpendicular to or away from the paper). In the present embodiment, the first polarizer 101 and the second polarizer 104 are, for instance, preformed in a manner of sheets, and are only disposed respectively on the outer surfaces of the first substrate 102 and the second substrate 103 by attachment or lamination after being cut into a predetermined size and contour. However, the invention is not limited thereto, and in another embodiment, a suitable metal gridline can also be directly formed outside the first substrate 102 and the second substrate 103 to achieve the same effect. Alternatively, in another embodiment, the first polarizer 101 and the second polarizer 104 can be formed via a coating method. The polarizing layer 130 is formed between the first display medium layer 120 and the second display medium layer 140 via a coating method. Therefore, the thickness of the polarizing layer 130 is less than the thicknesses of the first polarizer 101 and the second polarizer 104. For instance, the thicknesses of the first polarizer 101 and the second polarizer 104 are, for instance, 50 μm to 200 μm, and the thickness of the polarizing layer 130 can be 1 nm to 30 μm or less than 10 μm, but the invention is not limited thereto. In some embodiments, the thickness of the polarizing layer 130 can be 10 nm to 800 nm.

The first display medium layer 120 includes liquid crystal molecules LC, a first base material 121, and a plurality of first encapsulated particles 122. The liquid crystal molecules LC are filled in the first encapsulated particles 122, and the first encapsulated particles 122 are immobilized in the first base material 121. The first encapsulated particles 122 are nanosized. For instance, the size of the first encapsulated particles 122 is less than 400 nm, but the invention is not limited thereto. In some embodiments, the average size of the first encapsulated particles 122 is 1 nm to 400 nm. In some embodiments, the average size of the first encapsulated particles 122 is 10 nm to 400 nm.

In the present embodiment, the first encapsulated particles 122 can be made by complex coacervation, membrane emulsification (ME), in-situ polymerization, interfacial polymerization, or other suitable methods. For instance, the liquid crystal molecules LC are dripped into an emulsifier via an emulsification process. The emulsifier can be, for instance, a natural emulsifier such as chitosan, carrageenan, gelatin, arabia gum, albumin, alginate, or casein, or a synthetic emulsifier such as polyurethane (PU), poly(acrylic acid) (PAA), or polyethylene (PE). Next, a gelation process can be executed by adjusting, for instance, the temperature or pH value to form the first encapsulated particles 122. Next, the first encapsulated particles 122 and the first base material 121 are mixed, and then the mixture is formed on the first substrate 102 having the first driving layer 110 via printing, coating, or other suitable methods. In a subsequent step, the base material can be hardened to form the first display medium layer 120. As a result, the first encapsulated particles 122 are immobilized in the first base material 121 and remain immobilized, but the state or property of the liquid crystal molecule LC in the first encapsulated particles 122 can be changed when driven by an electric field.

The first driving layer 110 can, for instance, be used to provide a horizontal electric field to drive the first display medium layer 120. The first display medium layer 120 can trigger induced birefringence when driven by an electric field, and this phenomenon is called a Kerr effect. In a Kerr effect, the induced birefringence is proportional to the square of the electric field intensity. The first display medium layer 120 can achieve a shutter effect with the light absorption axes of the first polarizer 101 and the polarizing layer 130 via the Kerr effect. Moreover, an alignment layer is not needed between the first display medium layer 120 and the first driving layer 110, and an electrode or other members for forming a driving electric field is not needed between the first display medium layer 120 and the polarizing layer 130, such that the process and structure of the display panel 100 can be simplified and the thickness of the display panel 100 can be reduced.

In some embodiments, the first driving layer 110 can include a pixel electrode (such as a pixel electrode PE shown in FIG. 5) and a common electrode (such as a common electrode CE shown in FIG. 5) both having a slit pattern. The pixel electrode and the common electrode can be the same film layer, and the slit pattern of the pixel electrode and the slit pattern of the common electrode are alternately arranged. In the operation of the display panel 100, the pixel electrode and the common electrode can have different operating voltages, and therefore, the electric field formed between the pixel electrode and the common electrode drives the first display medium layer 120 to generate a display function. In other words, the display panel 100 driven by the first driving layer 110 can be an in-plane switching (IPS) liquid crystal display panel, but the invention is not limited thereto. In other embodiments, the pixel electrode and the common electrode can be different film layers. In other words, the display panel 100 driven by the first driving layer 110 can be a fringe field switching (FFS) liquid crystal display panel.

The second display medium layer 140 includes liquid crystal molecules LC, a second base material 141, and a plurality of second encapsulated particles 142. Similarly, the liquid crystal molecules LC are filled in the second encapsulated particles 142. The second encapsulated particles 142 are immobilized in the second base material 141 and remain immobilized, but the state or property of the liquid crystal molecules LC in the second encapsulated particles 142 can be changed when driven by an electric field. In short, the composition, property, and manufacturing method of the second display medium layer 140 can be similar to the composition, property, and manufacturing method of the first display medium layer 120, but the invention is not limited thereto. The second driving layer 150 can, for instance, be used to provide a horizontal electric field to drive the second display medium layer 140. The second display medium layer 140 can achieve a shutter effect with the light absorption axes of the second polarizer 104 and the polarizing layer 130 via the Kerr effect. In some embodiments, at least one of the first display medium layer 120 and the second display medium layer 140 can be formed by a base material and encapsulated particles. Therefore, one of the first display medium layer 120 and the second display medium layer 140 can also include liquid crystal molecules, electrophoretic display medium, or other suitable media that is not sealed and is dispersed between the substrate (102 or 103) and the polarizing layer 130.

In the present embodiment, the polarizing layer 130 can be formed on the first display medium layer 120 via a coating method and be directly in contact with the first display medium layer 120. The second display medium layer 140 can also be directly in contact with the polarizing layer 130. For instance, the manufacturing method of the display panel 100 can include forming the first display medium layer 120 on the first substrate 102 having the first driving layer 110 via a coating method; forming the polarizing layer 130 on the first display medium layer 120 via a coating method; forming the second display medium layer 140 on the second substrate 103 having the second driving layer 150 via a coating method; and assembling the first substrate 102 on which the first display medium layer 120 and the polarizing layer 130 are formed and the second substrate 103 on which the second display medium layer 140 is formed using the sealant 105. At this point, a distance 140a between the first display medium layer 120 and the second display medium layer 140 is substantially equal to a thickness 130b of the polarizing layer 130, and therefore the thickness of the display panel 100 can be reduced and the distance 140a between the first display medium layer 120 and the second display medium layer 140 can be reduced. Since the distance 140a between the first display medium layer 120 and the second display medium layer 140 is reduced, the issue of poor display caused by dimming offset can be alleviated. Moreover, the display panel 100 does not need to be made by combining two independent panels (such as four substrates), and therefore the occurrence of Moiré effect due to alignment error can be reduced.

Figure 2:
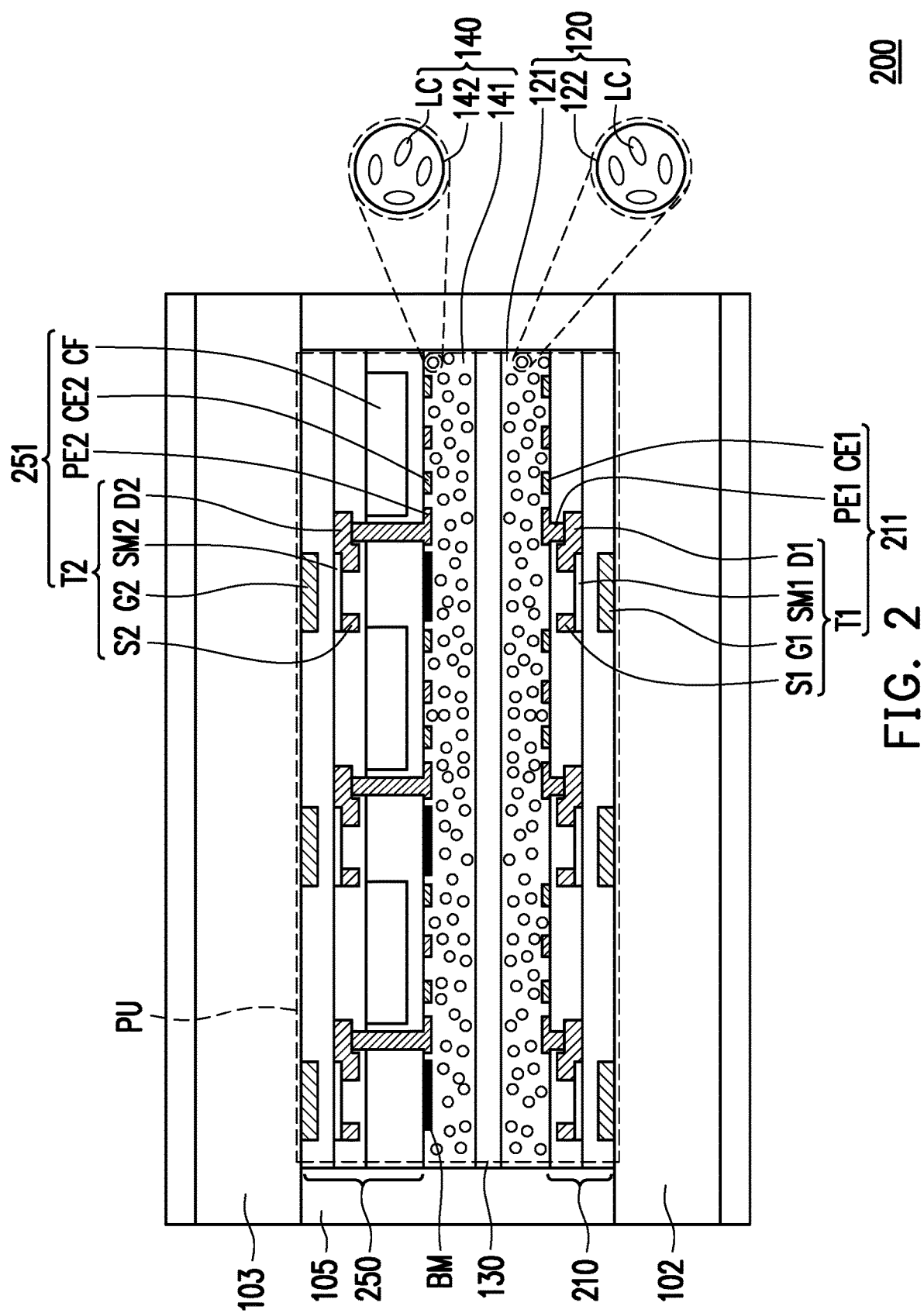
FIG. 2 is a cross section of a display panel according to the second embodiment of the invention.

FIG. 2 is a cross section of a display panel according to the second embodiment of the invention. A display panel 200 of the second embodiment is similar to the display panel 100 of FIG. 1. It should be mentioned that, in FIG. 1 and FIG. 2, the same or similar reference numerals represent the same or similar members, and therefore the members mentioned in FIG. 1 are not repeated herein. The first driving layer 210 includes a plurality of switch pixel structures 211. Each of the switch pixel structures 211 includes a first active device T1, a first pixel electrode PE1, and a first common electrode CE1, wherein the first active device T1 includes a first gate G1, a first channel SM1, a first source S1, and a first drain D1. The first channel SM1 is located between the first source S1 and the first drain D1. The first drain D1 is electrically connected to the first pixel electrode PE1. In operation, the first gate G1 can control on (conduction) and off (open) of the first active device T1. When the first active device T1 is on (conduction), the first active device T1 can allow the first source S1 to be electrically conducted to the first drain D1 via the first channel SM1, and the first pixel electrode PE1 receives a corresponding voltage transmitted from the first drain D1. The first common electrode CE1 is, for instance, electrically connected to a first common voltage source to receive a common voltage (Vcom) outputted by the first common voltage source. The first pixel electrode PE1 and the first common electrode CE1 can include slit electrode patterns that are alternately arranged. Therefore, the voltage difference between the first pixel electrode PE1 and the first common electrode CE1 can form a driving electric field driving the first display medium layer 120.

The second driving layer 250 includes a plurality of display pixel structures 251. Each of the display pixel structures 251 includes a second active device T2, a second pixel electrode PE2, and a second common electrode CE2, wherein the second active device T2 includes a second gate G2, a second channel SM2, a second source S2, and a second drain D2. The second channel SM2 is located between the second source S2 and the second drain D2. The second drain D2 and the second pixel electrode PE2 are electrically connected. In operation, the second gate G2 can control on (conduction) and off (open) of the second active device T2. When the second active device T2 is on (conduction), the second active device T2 can allow the second source S2 to be electrically conducted to the second drain D2 via the second channel SM2, and the second pixel electrode PE2 receives a corresponding voltage transmitted from the second drain D2. The second common electrode CE2 is, for instance, electrically connected to the second common voltage source to receive a common voltage outputted by the second common voltage source. The second pixel electrode PE2 and the second common electrode CE2 can include slit electrode patterns that are alternately arranged. Therefore, the voltage difference between the second pixel electrode PE2 and the second common electrode CE2 can form a driving electric field driving the second display medium layer 140.

The first pixel electrode PE1 and the first common electrode CE1 are disposed on the same plane, and the second pixel electrode PE2 and the second common electrode CE2 are disposed on the same plane so as to form an in-plane switching (IPS) pixel structure. In other embodiments, the switch pixel structure 211 and the display pixel structure 251 can also be fringe field switching (FFS) pixel structures. In other words, the first driving layer 210 and the second driving layer 250 are both used to provide a horizontal electric field to correspondingly drive the first display medium layer 120 and the second display medium layer 140. Moreover, a member controlling the state of the liquid crystal molecule LC such as an electrode or alignment layer is not needed between the first display medium layer 120 and the polarizing layer 130 and between the second display medium layer 140 and the polarizing layer 130.

In the present embodiment, the display panel 200 further includes a plurality of color filter patterns CF to achieve color display, and adjacent color filter patterns CF can have colors different from one another. In the present embodiment, the color filter patterns CF can be disposed on the second driving layer 250 and integrated in the display pixel structure 251. Therefore, the display pixel structure 251 is a color filter on array (COA) structure. Moreover, the display panel 200 can further include a shielding layer BM, and the location of the shielding layer BM is between adjacent color filter patterns CF. The shielding layer BM is also referred to as a black matrix (BM). The shielding layer BM can be integrated in the display pixel structure 251, and therefore the display pixel structure 251 can also be a black matrix on array structure (BOA). In other embodiments, the color filter patterns CF and the shielding layer BM can be, for instance, disposed between the second substrate 103 and the second driving layer 250, or at least one of the color filter patterns CF and the shielding layer BM can be integrated in the switch pixel structure 211 of the first driving layer 210.

In the display panel 200, the N display pixel structures 251 can form one basic display unit PU, wherein N is a positive integer greater than 1. The N display pixel structures 251 forming a single basic display unit PU can be used to control the display grayscale of different colors (such as red, green, and blue) to show the desired display color together. FIG. 2 shows three display pixel structures 251 forming a single basic display unit PU, but the invention is not limited thereto.

The switch pixel structure 211 is used to control the brightness of the display light required for of each of the basic display units PU. In the present embodiment, the plurality of switch pixel structures 211 corresponding to the same basic display unit PU causes the corresponding first display medium layer 120 to be bright (allowing light to pass through) or all be dark (blocking light) at the same time. With the configuration of switch pixel structure 211 and the display pixel structure 251, the contrast of the display panel can be increased, and the more detailed designs of the display pixel structure 251 and the switch pixel structure 211 are provided later.

When the display panel 200 displays an image, the second driving layer 250 (the display pixel structure) can be closer to the user in comparison to the first driving layer 210 (the switch pixel structure). Moreover, the structural design of the driving layer of the present embodiment can be applied in the embodiment of FIG. 1. For instance, the first driving layer 110 of FIG. 1 can include a plurality of the switch pixel structure 211 shown in FIG. 2, and the second driving layer 150 of FIG. 1 can include a plurality of the display pixel structure 251 shown in FIG. 2, but the invention is not limited thereto.

Figure 3:
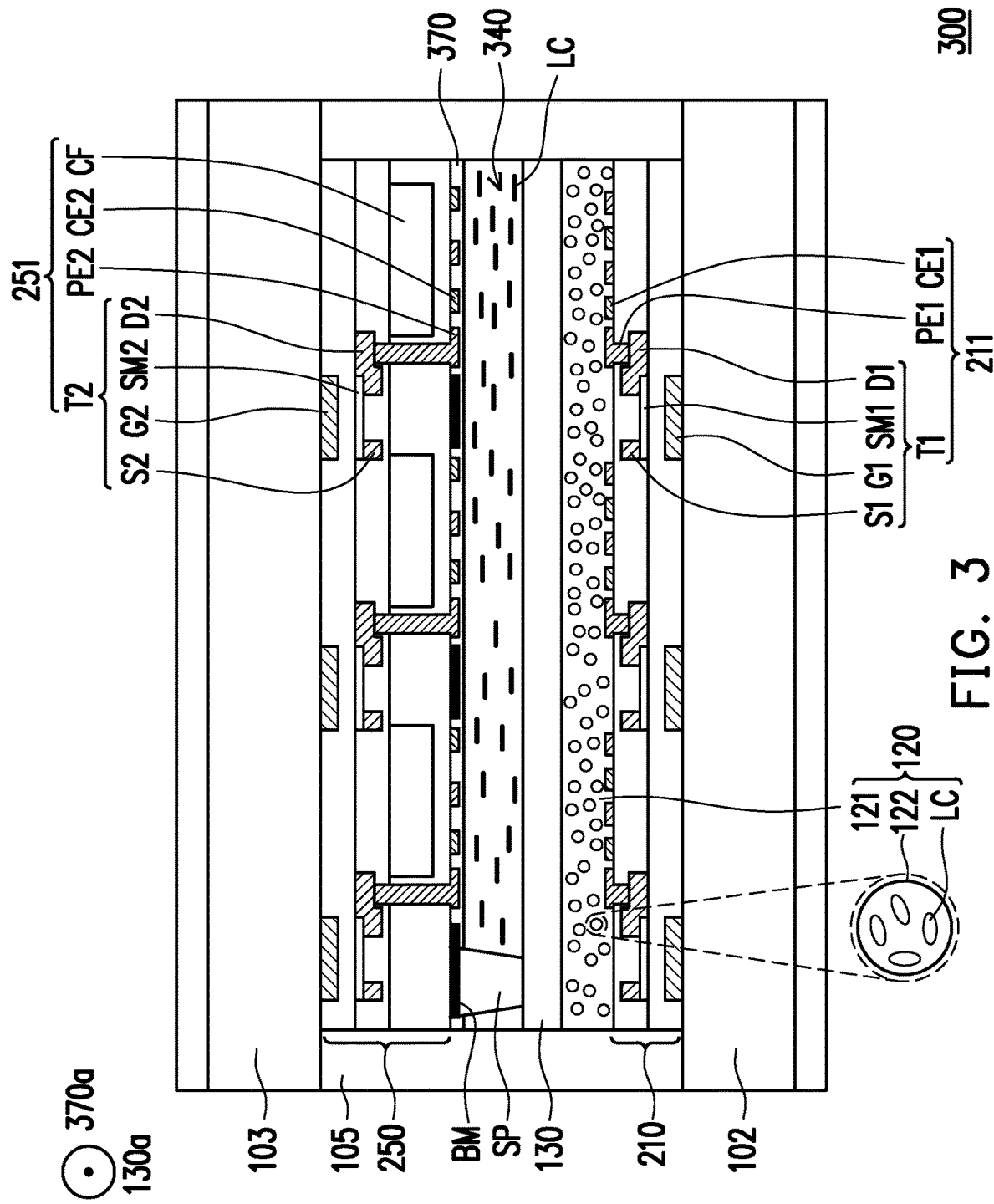
FIG. 3 is a cross section of a display panel according to the third embodiment of the invention.

FIG. 3 is a cross section of a display panel according to the third embodiment of the invention. A display panel 300 of the third embodiment is similar to the display panel 100 of FIG. 1 or the display panel 200 of FIG. 2. It should be mentioned that, in FIG. 3, the same or similar reference numerals as FIG. 1 and FIG. 2 represent the same or similar members, and therefore the members mentioned in FIG. 1 and FIG. 2 are not repeated herein. Referring to FIG. 3, the display panel 300 of the third embodiment is similar to the display panel 200 of FIG. 2, and the difference is that in the present embodiment, the composition of the second display medium layer 340 can include a plurality of liquid crystal molecules LC that is not sealed and is dispersed between the second substrate 103 and the polarizing layer 130. In the present embodiment, an alignment layer 370 can be further disposed between the second driving layer 250 and the second display medium layer 340. In some embodiments, an alignment direction 370a of the alignment layer 370 is parallel to the light absorption axis 130a of the polarizing layer 130 (such as a direction perpendicular to or away from the paper). Moreover, a spacer SP can be optionally further disposed between the second substrate 103 and the polarizing layer 130 to maintain an appropriate cell gap. However, the present embodiment is not limited thereto. In other possible embodiments, the alignment layer 370 and the spacer SP may be omitted, and/or the second display medium layer 340 can be formed by other display materials.

The manufacturing method of the display panel 300 can include forming the first display medium layer 120 on the first substrate 102 having the first driving layer 210 via a coating method; forming the polarizing layer 130 on the first display medium layer 120 via a coating method; forming the spacer SP and the alignment layer 370 on the second substrate 103 having the second driving layer 250; forming the liquid crystal molecules LC in the space surrounded by the sealant 105, the first substrate 102, or the second substrate 103 by one-drop fill (ODF) or vacuum injection; and assembling the first substrate 102 and the second substrate 103 using the sealant 105 to form the second display medium layer 340. Here, the liquid crystal molecules LC are filled between the polarizing layer 130 and the alignment layer 370 on the second substrate 103. Moreover, the spacer SP can directly contact with the polarizing layer 130.

Figure 4:
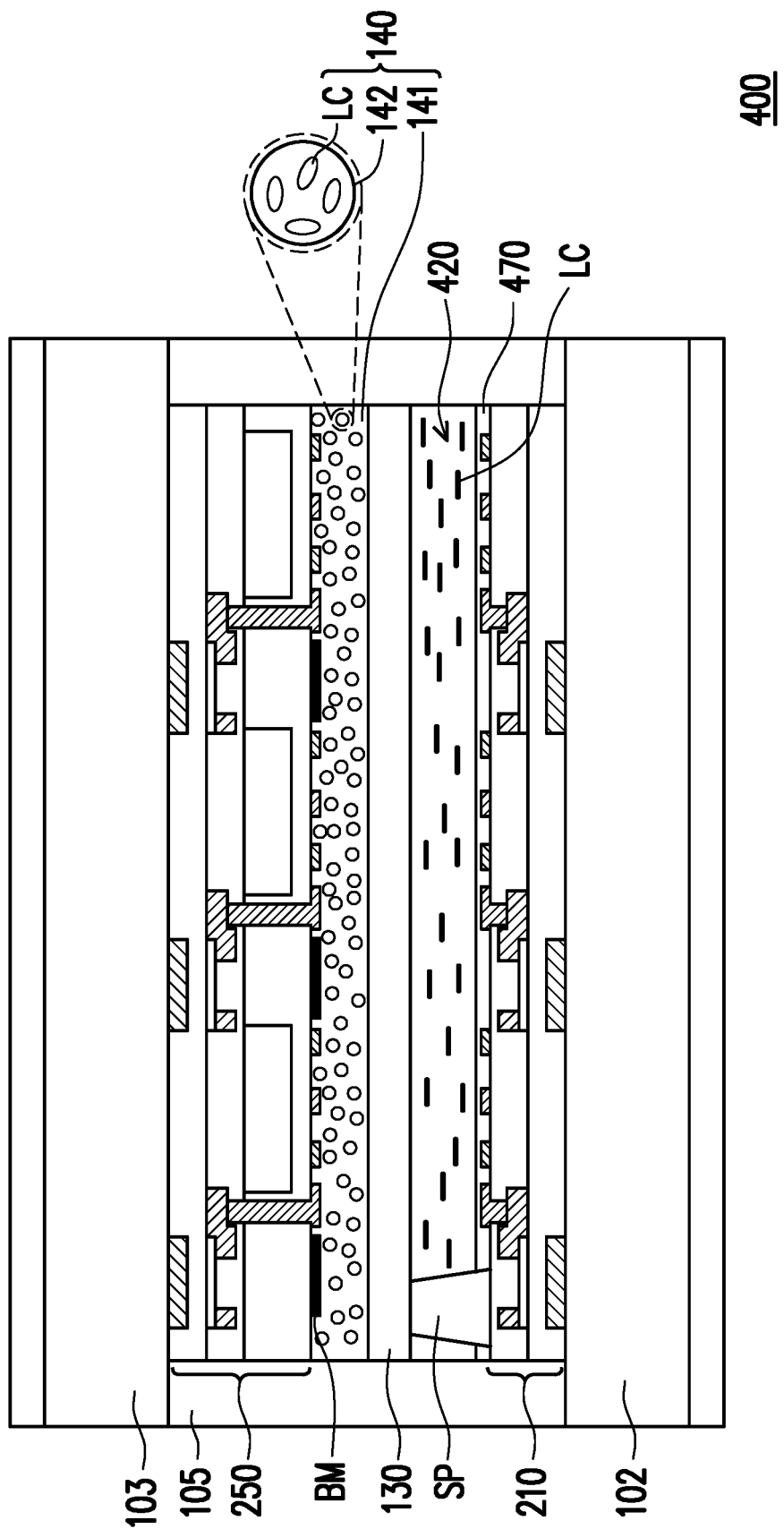
FIG. 4 is a cross section of a display panel according to the fourth embodiment of the invention.

FIG. 4 is a cross section of a display panel according to the fourth embodiment of the invention. A display panel 400 of the fourth embodiment is similar to the display panel 200 of FIG. 2. It should be mentioned that, in FIG. 4, the same or similar reference numerals as FIG. 1 to FIG. 2 represent the same or similar members, and therefore the members mentioned in FIG. 1 to FIG. 2 are not repeated herein. Referring to FIG. 4, the display panel 400 of the fourth embodiment is similar to the display panel 200 of FIG. 2, and the difference is that the composition of the first display medium layer 420 can include a plurality of liquid crystal molecules LC that is not sealed and is dispersed between the first substrate 102 and the polarizing layer 130. Moreover, the display panel 400 further includes an alignment layer 470 and a spacer SP. An alignment layer 470 is disposed between the first driving layer 210 and the first display medium layer 420. The spacer SP is disposed between the first substrate 102 and the polarizing layer 130 to maintain an appropriate cell gap.

The manufacturing method of the display panel 400 can include forming the second display medium layer 140 on the second substrate 103 having the second driving layer 250 via a coating method; forming the polarizing layer 130 on the second display medium layer 140 via a coating method; forming the spacer SP and the alignment layer 470 on the first substrate 102 having the first driving layer 210; forming the liquid crystal molecules LC in the space surrounded by the sealant 105, the first substrate 102, or the second substrate 103 by one-drop fill (ODF) or vacuum injection; and assembling the first substrate 102 and the second substrate 103 using the sealant 105 to form the first display medium layer 420. Therefore, the liquid crystal molecules LC are filled in the space between the polarizing layer 130 and the alignment layer 470 on the first substrate 102. The spacer SP can directly contact with the polarizing layer 130.

The switch pixel structure 211 or the display pixel structure 251 in the display panels 100, 200, 300, and 400 of the embodiments above can adopt a plurality of structural designs. In the following, a pixel structure for forming the switch pixel structure 211 or the display pixel structure 251 is described with reference to FIG. 5 to FIG. 7.

Figure 5:
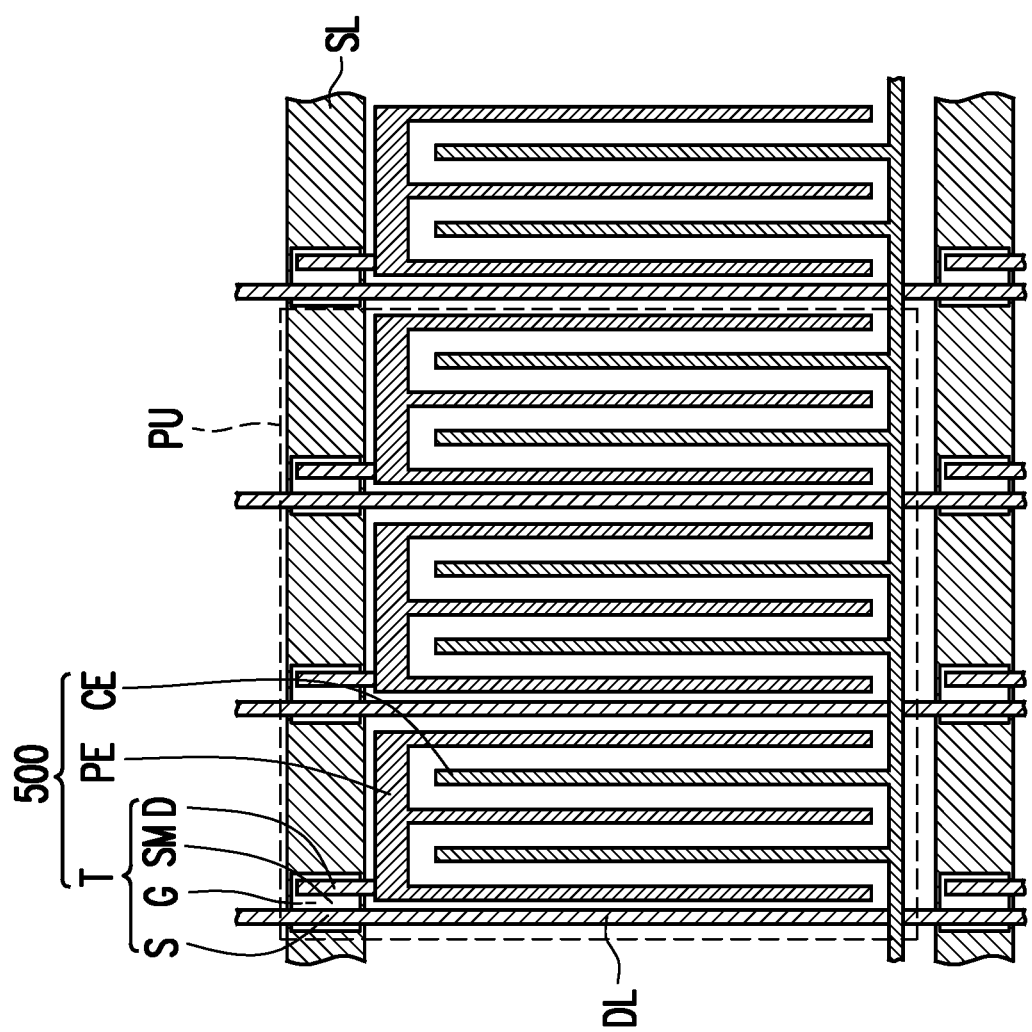
FIG. 5 is a partial top view of a pixel structure according to an embodiment of the invention.

FIG. 5 is a partial top view of a pixel structure according to an embodiment of the invention. To clearly describe the embodiments of the invention, some of the film layers are omitted in FIG. 5. A plurality of pixel structures 500 can be arranged in a row to form one basic display unit PU, and each of the pixel structures 500 is connected to one of a plurality of scan lines SL and one of a plurality of data lines DL. Each of the pixel structures 500 includes an active device T, a pixel electrode PE, and a common electrode CE, wherein the active device T includes a gate G, a channel SM, a source S, and a drain D. The channel SM is located between the drain D and the source S. The gate G is electrically connected to the scan lines SL. The source S is electrically connected to the data lines DL. The drain D is electrically connected to the pixel electrode PE.

The pixel electrode PE and the common electrode CE each have a slit pattern, and the slit pattern of the pixel electrode PE and the slit pattern of the common electrode CE are alternately arranged. Specifically, the switch pixel structure 211 or the display pixel structure 251 in the display panels 100, 200, 300, and 400 of the embodiments above can both be implemented by the pixel structure 500 shown in FIG. 5. When the switch pixel structure 211 and the display pixel structure 251 have the same structural design, the area of each of the switch pixel structures 211 can be correspondingly overlapped with the area of a single display pixel structure 251. When the display pixel structure 251 is implemented by the pixel structure 500 shown in FIG. 5, N pixel structures 500 can be arranged in a row to form one basic display unit PU (N is, for instance, 3), but the invention is not limited thereto.

Specifically, the pixel structure 500 of FIG. 5 can be applied in different driving layers of a single display panel. In the case of the display panel 200 shown in FIG. 2, in the display panel 200, the switch pixel structure 211 in the first driving layer 210 and the display pixel structure 251 of the second driving layer 250 can both be implemented by the pixel structure 500 of FIG. 5. Here, the area of the switch pixel structure 211 and the area of the display pixel structure 251 can be the same.

Figure 6:
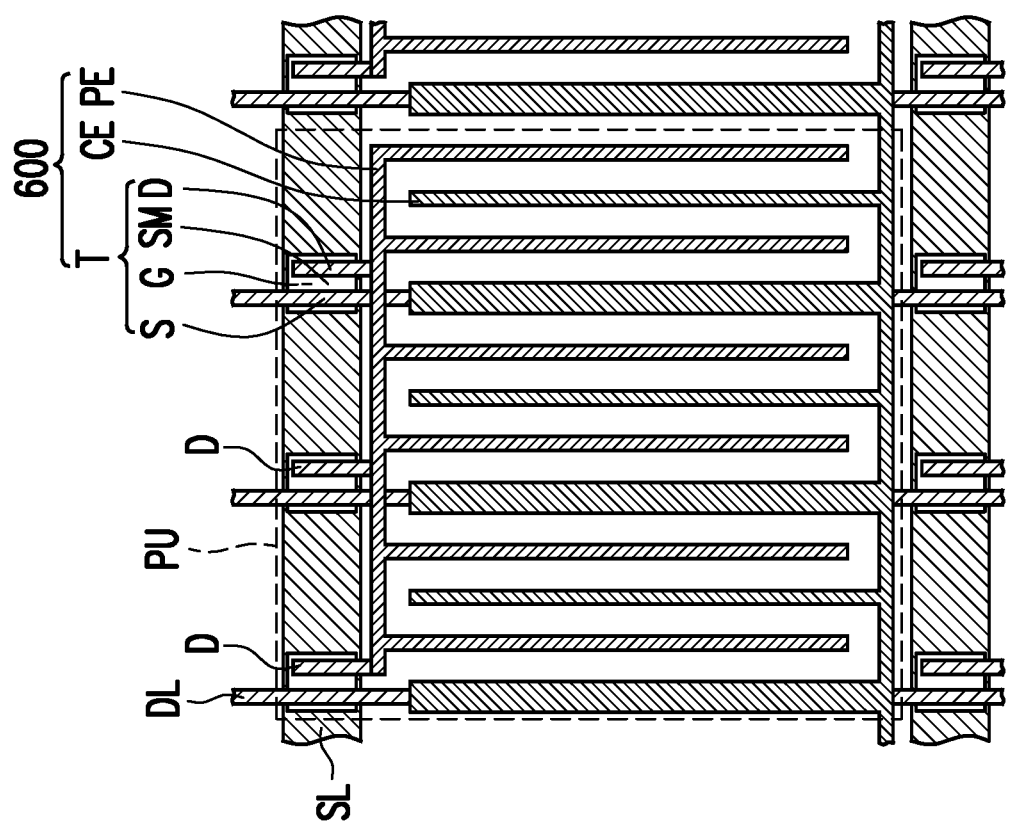
FIG. 6 is a partial top view of a pixel structure according to another embodiment of the invention.

FIG. 6 is a partial top view of a pixel structure according to another embodiment of the invention. To clearly describe the embodiments of the invention, some of the film layers are omitted in FIG. 6. A pixel structure 600 of FIG. 6 is similar to the pixel structure 500 of FIG. 5. It should be mentioned that, in FIG. 6, the same or similar reference numerals as FIG. 5 represent the same or similar members, and therefore the members mentioned in FIG. 6 are not repeated herein. Referring to FIG. 6, the pixel structure 600 is similar to the pixel structure 500 of FIG. 5, and the difference is that in a single basic display unit PU, the pixel electrodes PE of a plurality of pixel structures 600 can be electrically connected to one another. The switch pixel structure 211 in any of the display panels 100, 200, 300, and 400 of the embodiments above can be implemented by the pixel structure 600 shown in FIG. 6. Moreover, the corresponding display pixel structure 251 can be implemented by the pixel structure 500 of FIG. 5. At this point, in the pixel structure 600 of the switch pixel structure 211, N pixel structures 600 with the connected pixel electrodes PE belong to one basic display unit PU, which correspond to the N display pixel structures 251 of a single basic display unit PU. Under this configuration, the N switch pixel structures 600 are operated in an equipotential manner. Here, N is a positive integer greater than 1 (for instance, N is 3). That is, the first pixel electrodes PE1 of the plurality of switch pixel structures 211 corresponding to the same basic display unit PU can be driven by the same signal to decide whether a display light is to be provided to a plurality of corresponding display pixel structures 251 in the basic display unit PU.

Figure 7:
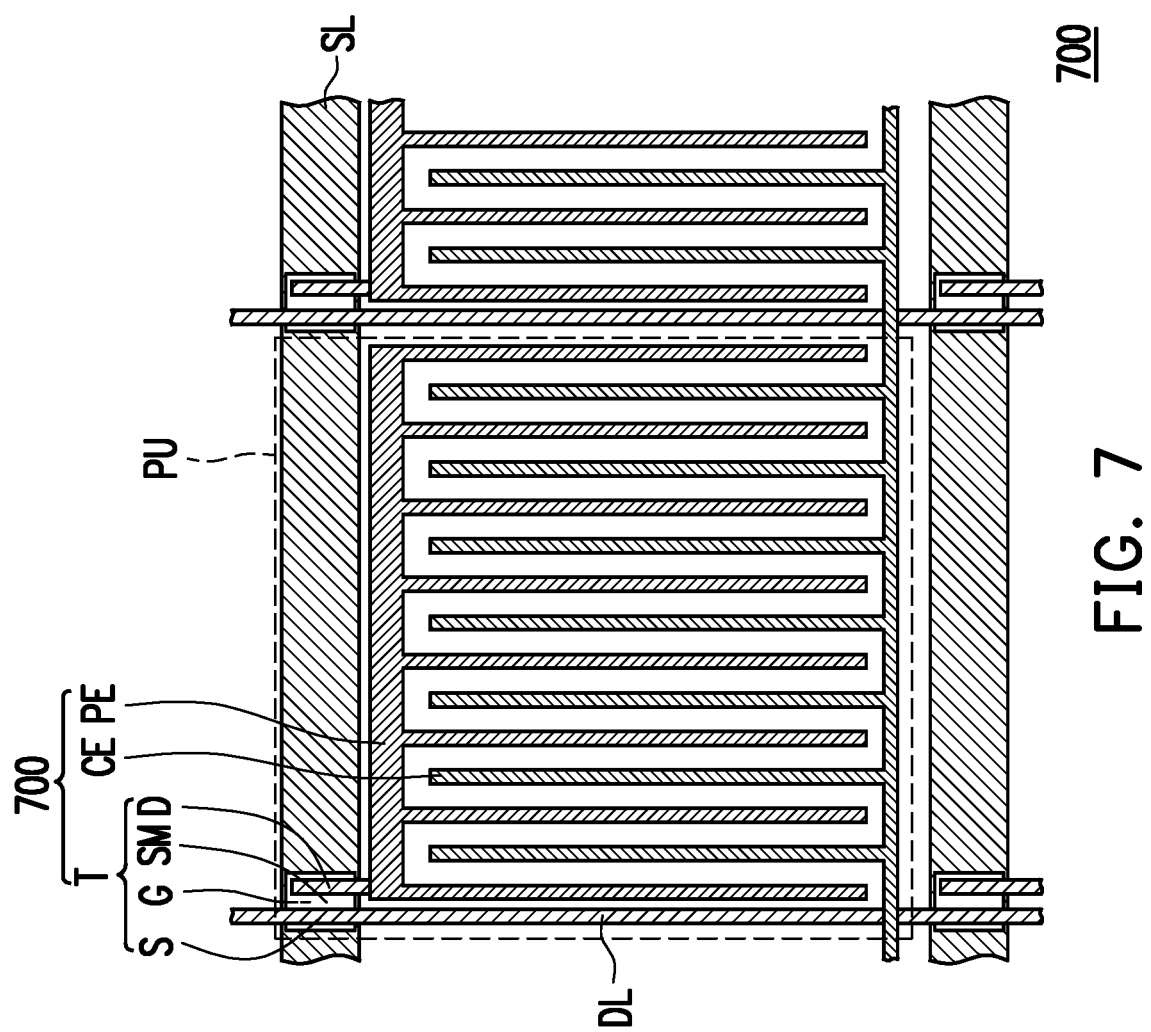
FIG. 7 is a partial top view of a pixel structure according to yet another embodiment of the invention.

FIG. 7 is a partial top view of a pixel structure according to yet another embodiment of the invention. To clearly describe the embodiments of the invention, some of the film layers are omitted in FIG. 7. A pixel structure 700 of the present embodiment is similar to the pixel structure 500 of FIG. 5. It should be mentioned that, in FIG. 7, the same or similar reference numerals as FIG. 5 represent the same or similar members, and therefore the members mentioned in FIG. 5 are not repeated herein. Referring to FIG. 7, the pixel structure 700 of FIG. 7 is similar to the pixel structure 500 of FIG. 5, and the difference is that in comparison to the pixel structure 500 of FIG. 5, a single pixel structure 700 of FIG. 7 has a greater area, wherein the single pixel structure 700 of the present embodiment can form one pixel unit PU. Specifically, the pixel structure 500 of FIG. 5 and the pixel structure 700 of FIG. 7 can be applied in different driving layers of a single display panel.

Figure 8:
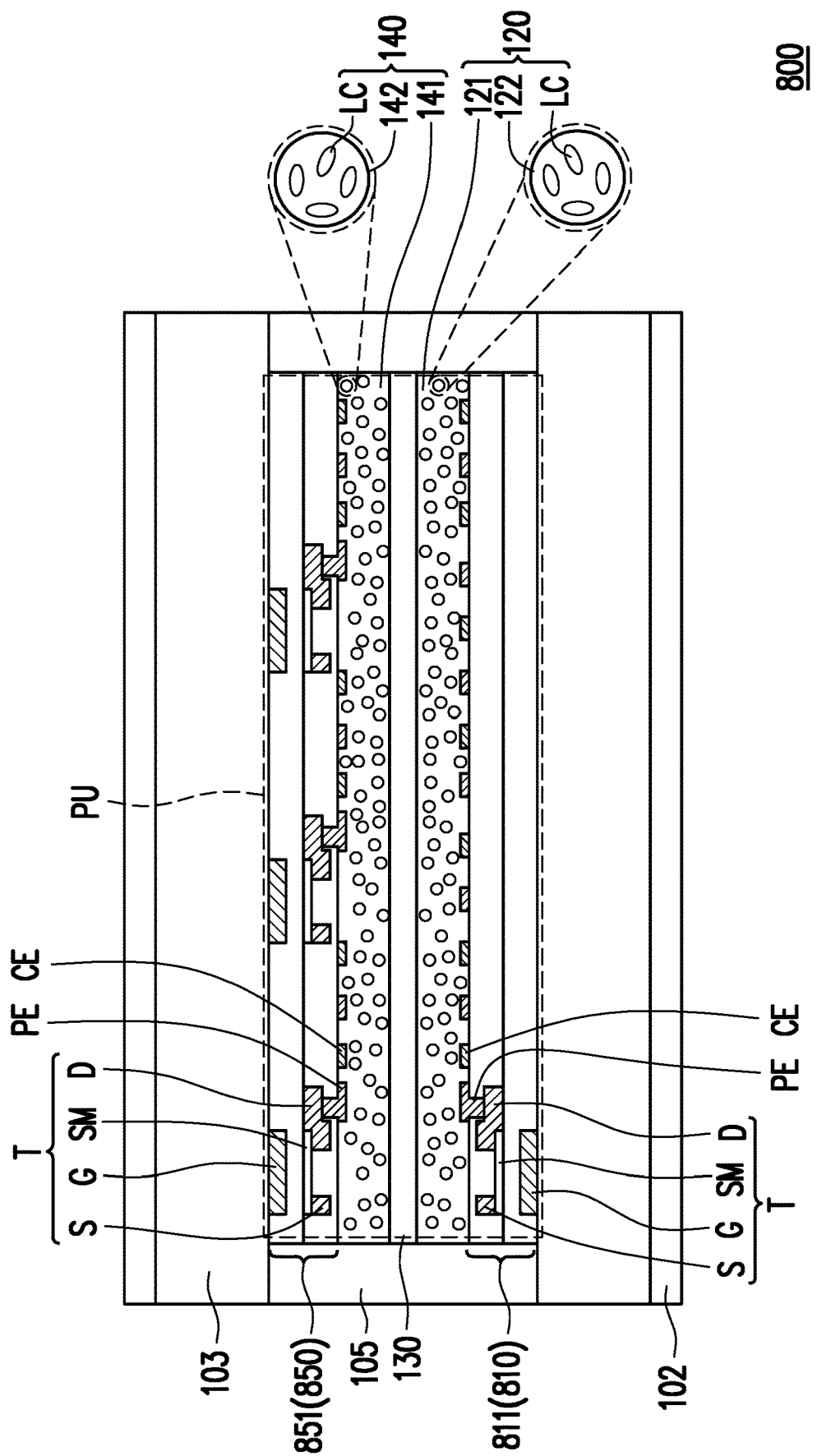
FIG. 8 is a cross section of a display panel according to still yet another embodiment of the invention.

In the case of a display panel 800 shown in FIG. 8, a switch pixel structure 811 in a first driving layer 810 of the display panel 800 can be implemented by the pixel structure 700 shown in FIG. 7, and a display pixel structure 851 of the second driving layer 850 can be implemented by the pixel structure 500 of FIG. 5. In the present embodiment, a single basic display unit PU includes, for instance, three display pixel structures 851, and the area of the switch pixel structure 811 is, for instance, 3 times that of the display pixel structure 851. In other words, in the normal direction of the display panel 800, the area of a single switch pixel structure 811 can be correspondingly overlapped with the area of a plurality of display pixel structures 851 of a single basic display unit PU, and the display pixel structures 851 corresponding to the same switch pixel structure 811 can belong to the same basic display unit PU. As a result, on or off of a single switch pixel structure 811 can decide whether the plurality of display pixel structures 851 in one basic display unit PU provides a display light, and the structural design of the first driving layer 810 can be simplified or the area of the switch pixel structure 811 can be greater than the area of the display pixel structures 851.

Based on the above, in the display panel of the invention, the first display medium layer and/or the second display medium layer includes a base material and a plurality of encapsulated particles, a liquid crystal molecule is filled in the encapsulated particles, the encapsulated particles are immobilized in the base material, and a polarizing layer is formed between the first display medium layer and the second display medium layer via a coating method. As a result, the first display medium layer and/or the second display medium layer can be in direct contact with the polarizing layer, and therefore the thickness of the display panel can be reduced, and the distance between the first display medium layer and the second display medium layer can be reduced, such that the issues of Moiré effect and dimming offset can be alleviated.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A display panel, comprising:
   a first substrate;
   a second substrate;
   a first display medium layer disposed between the first substrate and the second substrate, wherein the first display medium layer comprises a first base material and a plurality of first encapsulated particles immobilized in the first base material, and an average size of the first encapsulated particles is 1 nm to 400 nm;
   a polarizing layer disposed between the first display medium layer and the second substrate, wherein the polarizing layer is in contact with the first display medium layer;
   a second display medium layer disposed between the polarizing layer and the second substrate; and
   a first polarizer and a second polarizer, wherein the first polarizer is disposed on an outside of the first substrate and the second polarizer is disposed on an outside of the second substrate such that the first substrate and the second substrate are located between the first polarizer and the second polarizer.
2. The display panel of claim 1, wherein a plurality of liquid crystal molecules is filled in the first encapsulated particles.
3. The display panel of claim 1, further comprising a sealant, wherein the sealant is disposed between the first substrate and the second substrate, and the sealant surrounds the first display medium layer, the second display medium layer, and the polarizing layer.
4. The display panel of claim 1, wherein a light absorption axis direction of the polarizing layer is perpendicular to a light absorption axis direction of the first polarizer and also perpendicular to a light absorption axis direction of the second polarizer.

5. The display panel of claim 1, wherein a distance between the first display medium layer and the second display medium layer is substantially equal to a thickness of the polarizing layer.

6. The display panel of claim 1, wherein the second display medium layer comprises a plurality of liquid crystal molecules.

7. The display panel of claim 6, wherein the second display medium layer further comprises a second base material and a plurality of second encapsulated particles immobilized in the second base material, the liquid crystal molecules are filled in the second encapsulated particles, and an average size of the second encapsulated particles is 1 urn to 400 nm.

8. The display panel of claim 6, further comprising an alignment layer disposed between the second substrate and the second display medium layer, and an alignment direction of the alignment layer is parallel to a light absorption axis direction of the polarizing layer.

9. The display panel of claim 1, wherein the polarizing layer is in contact with the second display medium layer.

10. The display panel of claim 1, wherein a thickness of the polarizing layer is 1 nm to 30 μm.

11. The display panel of claim 1, further comprising a first driving layer and a second driving layer, wherein the first driving layer is disposed between the first substrate and the first display medium layer, and the second driving layer is disposed between the second substrate and the second display medium layer.

12. A display panel, comprising:
 a first substrate;
 a second substrate;
 a first display medium layer disposed between the first substrate and the second substrate, wherein the first display medium layer comprises a first base material and a plurality of first encapsulated particles immobilized in the first base material, and an average size of the first encapsulated particles is 1 nm to 400 nm;
 a polarizing layer disposed between the first display medium layer and the second substrate, wherein the polarizing layer is in contact with the first display medium layer; and
 a second display medium layer disposed between the polarizing layer and the second substrate, wherein the second display medium layer comprises a plurality of liquid crystal molecules, a second base material and a plurality of second encapsulated particles immobilized in the second base material, the liquid crystal molecules are filled in the second encapsulated particles, and an average size of the second encapsulated particles is 1 nm to 400 nm.

13. The display panel of claim 12, further comprising a sealant, wherein the sealant is disposed between the first substrate and the second substrate, and the sealant surrounds the first display medium layer, the second display medium layer, and the polarizing layer.

14. The display panel of claim 12, further comprising an alignment layer disposed between the second substrate and the second display medium layer, and an alignment direction of the alignment layer is parallel to a light absorption axis direction of the polarizing layer.

15. The display panel of claim 12, further comprising a first driving layer and a second driving layer, wherein the first driving layer is disposed between the first substrate and the first display medium layer, and the second driving layer is disposed between the second substrate and the second display medium layer.

16. A display panel, comprising:
 a first substrate;
 a second substrate;
 a first display medium layer disposed between the first substrate and the second substrate, wherein the first display medium layer comprises a first base material and a plurality of first encapsulated particles immobilized in the first base material, and an average size of the first encapsulated particles is 1 nm to 400 nm;
 a polarizing layer disposed between the first display medium layer and the second substrate, wherein the polarizing layer is in contact with the first display medium layer, and a thickness of the polarizing layer is 1 nm to 30 μm; and
 a second display medium layer disposed between the polarizing layer and the second substrate.

17. The display panel of claim 16, wherein a plurality of liquid crystal molecules is filled in the first encapsulated particles.

18. The display panel of claim 16, further comprising a sealant, wherein the sealant is disposed between the first substrate and the second substrate, and the sealant surrounds the first display medium layer, the second display medium layer, and the polarizing layer.

19. The display panel of claim 16, wherein the polarizing layer is in contact with the second display medium layer.

20. The display panel of claim 16, further comprising a first driving layer and a second driving layer, wherein the first driving layer is disposed between the first substrate and the first display medium layer, and the second driving layer is disposed between the second substrate and the second display medium layer.

* * * * *